US011790825B2

(12) United States Patent
Hu et al.

(10) Patent No.: US 11,790,825 B2
(45) Date of Patent: Oct. 17, 2023

(54) BACKLIGHT BRIGHTNESS CONTROL METHOD, BACKLIGHT BRIGHTNESS CONTROL DEVICE, AND DISPLAY EQUIPMENT

(71) Applicant: TCL CHINA STAR OPTOELECTRONICS TECHNOLOGY CO., LTD., Guangdong (CN)

(72) Inventors: Xiong Hu, Guangdong (CN); Yu Wu, Guangdong (CN); Haoran Li, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 71 days.

(21) Appl. No.: 17/295,481

(22) PCT Filed: Apr. 20, 2021

(86) PCT No.: PCT/CN2021/088369
§ 371 (c)(1),
(2) Date: May 20, 2021

(87) PCT Pub. No.: WO2022/217628
PCT Pub. Date: Oct. 20, 2022

(65) Prior Publication Data
US 2022/0358871 A1 Nov. 10, 2022

(51) Int. Cl.
*G09G 3/34* (2006.01)
*H05B 45/46* (2020.01)
(Continued)

(52) U.S. Cl.
CPC ......... *G09G 3/2018* (2013.01); *G09G 3/3406* (2013.01); *G09G 2320/0233* (2013.01);
(Continued)

(58) Field of Classification Search
CPC ............... G09G 3/2018; G09G 3/3406; G09G 2320/0233; G09G 2320/0633; G09G 2320/064–066; G09G 2330/021
See application file for complete search history.

(56) References Cited

U.S. PATENT DOCUMENTS

2002/0005861 A1* 1/2002 Lewis .................. G09G 3/3406 345/691
2006/0192899 A1* 8/2006 Ogita .................. H04N 9/3155 348/E9.027
(Continued)

FOREIGN PATENT DOCUMENTS

CN 102708804 A 10/2012
CN 103327696 A 9/2013
(Continued)

*Primary Examiner* — Lin Li
(74) *Attorney, Agent, or Firm* — Mark M. Friedman

(57) ABSTRACT

A backlight brightness control method, a backlight brightness control device, and a display equipment are provided. By using a constant current integrated circuit to input constant current to backlight sources in backlight partitions, uniformity of backlight brightness is allowed to be improved. By determining a target peak current inputted to the backlight sources in the backlight partitions according to a grayscale level of partition images, not only can the backlight brightness required by a high grayscale level be ensured, but fine adjustment of the backlight brightness under a low grayscale level can also be ensured.

14 Claims, 5 Drawing Sheets

(51) Int. Cl.
*H04N 9/31* (2006.01)
*G09G 3/20* (2006.01)

(52) U.S. Cl.
CPC . *G09G 2320/064* (2013.01); *G09G 2320/066* (2013.01); *G09G 2320/0633* (2013.01); *G09G 2330/021* (2013.01)

(56) References Cited

U.S. PATENT DOCUMENTS

| | | | | |
|---|---|---|---|---|
| 2010/0283397 | A1* | 11/2010 | Chen | H05B 45/46 315/192 |
| 2011/0122165 | A1 | 5/2011 | Sengoku | |
| 2011/0316902 | A1 | 12/2011 | Onishi et al. | |
| 2016/0335957 | A1 | 11/2016 | Fu et al. | |
| 2018/0350308 | A1* | 12/2018 | Zhang | G09G 3/342 |
| 2020/0027408 | A1* | 1/2020 | Xi | G09G 3/3426 |
| 2021/0217370 | A1* | 7/2021 | Sun | G09G 3/3426 |

FOREIGN PATENT DOCUMENTS

| | | | | | |
|---|---|---|---|---|---|
| CN | 104505055 | A | | 4/2015 | |
| CN | 105590609 | A | | 5/2016 | |
| CN | 105632421 | A | * | 6/2016 | G09G 3/3406 |
| CN | 105913811 | A | | 8/2016 | |
| CN | 107424572 | A | | 12/2017 | |
| CN | 111091788 | A | | 5/2020 | |

* cited by examiner

BACKLIGHT BRIGHTNESS CONTROL METHOD, BACKLIGHT BRIGHTNESS CONTROL DEVICE, AND DISPLAY EQUIPMENT

BACKGROUND OF INVENTION

Field of Invention

The present disclosure relates to the field of display technology and particularly to a backlight brightness control method, a backlight brightness control device, and a display equipment.

Description of Prior Art

With development of display technology, because flat-panel displays have advantages of high definition, good image color, power saving, lightness and thinness, and convenience of portability, they have been widely used in products displaying various information such as mobile phones, smart watches, tablet computers, notebook computers, TVs, etc., and have broad market prospects. However, with increasing maturity of driving technology in the display industry, opportunities and challenges have also emerged. Regarding liquid crystal display (LCDs), limitations of their backlight, such as high power consumption and low display contrast, force the backlight to be developed in a locally controllable direction. Therefore, mini light emitting diodes (mini-LEDs) backlight module have come into being.

Driving solutions of constant voltage integrated circuits (ICs) and passive matrices (PMs) are mostly used in conventional mini-LED backlight modules to achieve partial control of the backlight. However, this control method can cause uneven backlight brightness and difficulty of fine adjustment on backlight brightness.

SUMMARY OF INVENTION

The present disclosure provides a backlight brightness control method, a backlight brightness control device, and a display equipment to solve a problem that uneven brightness of mini-LED backlight modules and difficulty of fine adjustment on backlight brightness incurred by current control methods.

On a first aspect, the present disclosure provides a backlight brightness control method used in display equipment. The display equipment includes a display panel and a backlight module providing backlight to the display panel. The backlight module includes a plurality of backlight partitions. The display panel is configured to display images. The images include a plurality of partition images respectively corresponding to the plurality of backlight partitions one-to-one. The backlight brightness control method includes:

obtaining an initial duty cycle of pulse width modulation waves of backlight sources in the backlight partitions corresponding to the partition images according to grayscale data of the partition images for any of the partition images;

determining peak current adjustment coefficients and duty cycle adjustment coefficients of the pulse width modulation waves according to the initial duty cycle, wherein the peak current adjustment coefficients are positively correlated to the initial duty cycle;

determining a target peak current according to the peak current adjustment coefficients and a pre-obtained initial peak current of the backlight sources in the backlight partitions, and determining a target duty cycle according to the duty cycle adjustment coefficients and the initial duty cycle; and inputting the target peak current and the pulse width modulation waves having the target duty cycle to the backlight sources in the backlight partitions.

In several embodiments, determining peak current adjustment coefficients and the duty cycle adjustment coefficients of the pulse width modulation waves according to the initial duty cycle includes:

using reciprocals of the peak current adjustment coefficients as the duty cycle adjustment coefficients of the pulse width modulation waves of the backlight sources in the backlight partitions.

In several embodiments, determining peak current adjustment coefficients and the duty cycle adjustment coefficients of the pulse width modulation waves according to the initial duty cycle includes:

using the peak current adjustment coefficients corresponding to the initial duty cycle falling within initial duty cycle intervals as the peak current adjustment coefficients of the backlight sources in the backlight partitions according to a corresponding relation between preset initial duty cycle intervals and the peak current adjustment coefficients.

In several embodiments, after inputting the target peak current and the pulse width modulation waves having the target duty cycle to the backlight sources in the backlight partitions further includes:

determining target duty cycle intervals according to the initial duty cycle intervals and the duty cycle adjustment coefficients; and realizing brightness adjustment of the backlight sources in the backlight partitions by adjusting a duty cycle of the pulse width modulation waves in the target duty cycle intervals.

In several embodiments, determining the target duty cycle intervals according to the initial duty cycle intervals and the duty cycle adjustment coefficients includes:

determining a minimum endpoint value in the initial duty cycle intervals in which the initial duty cycle falls within;

multiplying the minimum endpoint value by the duty cycle adjustment coefficients to obtain a minimum target endpoint value; and using intervals composed of the minimum target endpoint value and a maximum target endpoint value as the target duty cycle intervals, and wherein the maximum target endpoint value is 100%.

In several embodiments, the initial duty cycle intervals are respectively [0, 25%], (25%, 50%], (50%, 75%], and (75%, 100%], and correspondingly the peak current adjustment coefficients are respectively 0.25, 0.5, 0.75, and 1, and the target duty cycle intervals are respectively [0, 100%], (50%, 100%], (66.7%, 100%], and (75%, 100%].

In several embodiments, obtaining the initial duty cycle of pulse width modulation waves of the backlight sources in the backlight partitions corresponding to the partition images according to the grayscale data of the partition images includes:

perform a digital-to-analog conversion on the grayscale data of the partition images to obtain the initial duty cycle of the pulse width modulation waves of the backlight sources in the backlight partitions corresponding to the partition images.

In several embodiments, determining the target peak current according to the peak current adjustment coefficients and the pre-obtained initial peak current of the backlight sources in the backlight partitions and determining the target duty cycle according to the duty cycle adjustment coefficients and the initial duty cycle include:

multiply the initial peak current by the peak current adjustment coefficient to obtain the target peak current, and multiplying the initial duty cycle by the duty cycle adjustment coefficients to obtain the target duty cycle.

On a second aspect, the present disclosure provides a backlight brightness control device used in display equipment. The display equipment includes a display panel and a backlight module providing backlight to the display panel. The backlight module includes a plurality of backlight partitions. The display panel is configured to display images. The images include a plurality of partition images respectively corresponding to the plurality of backlight partitions one-to-one. The backlight brightness control device includes:

an initial duty cycle determining module configured to obtain an initial duty cycle of pulse width modulation waves of backlight sources in the backlight partitions corresponding to the partition images according to grayscale data of the partition images for any of the partition images;

an adjustment coefficient determining module configured to determine the peak current adjustment coefficients and duty cycle adjustment coefficients of the pulse width modulation waves according to the initial duty cycle, wherein the peak current adjustment coefficients are positively correlated to the initial duty cycle;

a target determining module configured to determine a target peak current according to the peak current adjustment coefficients and a pre-obtained initial peak current of the backlight sources in the backlight partitions and to determine a target duty cycle according to the duty cycle adjustment coefficients and the initial duty cycle; and an inputting module configured to input the target peak current and the pulse width modulation waves having the target duty cycle to the backlight sources in the backlight partitions.

In several embodiments, the adjustment coefficient determining module is specifically configured to to use reciprocals of the peak current adjustment coefficients as the duty cycle adjustment coefficients of the pulse width modulation waves of the backlight sources in the backlight partitions.

In several embodiments, the adjustment coefficient determining module is specifically configured to use the peak current adjustment coefficients corresponding to the initial duty cycle falling within initial duty cycle intervals as the peak current adjustment coefficients of the backlight sources in the backlight partitions according to a corresponding relation between preset initial duty cycle intervals and the peak current adjustment coefficients.

In several embodiments, the backlight brightness control device further includes:

a target duty cycle interval determining module configured to determine target duty cycle intervals according to the initial duty cycle intervals and the duty cycle adjustment coefficients; and a brightness adjustment module configured to realize brightness adjustment of the backlight sources in the backlight partitions by adjusting a duty cycle of the pulse width modulation waves in the target duty cycle intervals.

In several embodiments, the target duty cycle interval determining module includes:

a minimum endpoint value determining unit configured to determine a minimum endpoint value in the initial duty cycle intervals in which the initial duty cycle falls within;

a minimum target endpoint value determining unit configured to multiply the minimum endpoint value by the duty cycle adjustment coefficients to obtain a minimum target endpoint value; and a target duty cycle interval determining unit configured to using intervals composed of the minimum target endpoint value and a maximum target endpoint value as the target duty cycle intervals, and wherein the maximum target endpoint value is 100%.

In several embodiments, the initial duty cycle intervals are respectively [0, 25%], (25%, 50%], (50%, 75%], and (75%, 100%], and correspondingly the peak current adjustment coefficients are respectively 0.25, 0.5, 0.75, and 1, and the target duty cycle intervals are respectively [0, 100%], (50%, 100%], (66.7%, 100%], and (75%, 100%].

In several embodiments, the initial duty cycle determining module is specifically configured to perform a digital-to-analog conversion on the grayscale data of the partition images to obtain the initial duty cycle of the pulse width modulation waves of the backlight sources in the backlight partitions corresponding to the partition images.

In several embodiments, the target determining module is specifically configured to multiply the initial peak current by the peak current adjustment coefficient to obtain the target peak current, and multiplying the initial duty cycle by the duty cycle adjustment coefficients to obtain the target duty cycle.

On a third aspect, the present disclosure provides a display equipment, including a backlight brightness control device, a display panel, and a backlight module providing backlight to the display panel, the backlight module comprises a plurality of backlight partitions, the display panel is configured to display images, the images comprise a plurality of partition images respectively corresponding to the plurality of backlight partitions one-to-one, wherein the backlight brightness control device includes:

an initial duty cycle determining module configured to obtain an initial duty cycle of pulse width modulation waves of backlight sources in the backlight partitions corresponding to the partition images according to grayscale data of the partition images for any of the partition images;

an adjustment coefficient determining module configured to determine the peak current adjustment coefficients and duty cycle adjustment coefficients of the pulse width modulation waves according to the initial duty cycle, wherein the peak current adjustment coefficients are positively correlated to the initial duty cycle;

a target determining module configured to determine a target peak current according to the peak current adjustment coefficients and a pre-obtained initial peak current of the backlight sources in the backlight partitions and to determine a target duty cycle according to the duty cycle adjustment coefficients and the initial duty cycle; and an inputting module configured to input the target peak current and the pulse width modulation waves having the target duty cycle to the backlight sources in the backlight partitions.

In several embodiments, the adjustment coefficient determining module is specifically configured to use reciprocals of the peak current adjustment coefficients as the duty cycle adjustment coefficients of the pulse width modulation waves of the backlight sources in the backlight partitions.

In several embodiments, the adjustment coefficient determining module is specifically configured to.

use the peak current adjustment coefficients corresponding to the initial duty cycle falling within initial duty cycle intervals as the peak current adjustment coefficients of the backlight sources in the backlight partitions according to a corresponding relation between preset initial duty cycle intervals and the peak current adjustment coefficients.

In several embodiments, the backlight brightness control device further includes:

a target duty cycle interval determining module configured to determine target duty cycle intervals according to the initial duty cycle intervals and the duty cycle adjustment coefficients; and a brightness adjustment module configured to realize brightness adjustment of the backlight sources in the backlight partitions by adjusting a duty cycle of the pulse width modulation waves in the target duty cycle intervals.

In the backlight brightness control method, the backlight brightness control device, and the display equipment, because the constant current integrated circuit is used to input the constant current to the backlight sources in the backlight partitions, the uniformity of the backlight brightness can be improved; and because the target peak current inputted to the backlight sources in the backlight partitions can be determined according to the grayscale level of the partition images, not only the backlight brightness required by the high grayscale level can be ensured, but also fine adjustment of the backlight brightness under the low grayscale level can be ensured.

DETAILED DESCRIPTION OF EMBODIMENTS

For making the purposes, technical solutions and effects of the present disclosure be clearer and more definite, the present disclosure will be further described in detail below. It should be understood that the specific embodiments described herein are merely for explaining the present disclosure and are not intended to limit the present disclosure.

In order to reduce power consumption of liquid crystal displays and to improve display contrast thereof, mini-LED backlight modules are usually used in the liquid crystal displays, and a driving solution of constant voltage integrated circuits collocated with passive matrices is used to realize local control of backlight. For ease of description, the liquid crystal display is referred to as display equipment; a mini-LED backlight module is referred to as a backlight module, and mini-LED chips in the mini-LED backlight module are referred to as backlight sources. Regarding the backlight module, it can be divided into a plurality of backlight partitions, and backlight sources included by each backlight partition can be individually controlled. Specifically, the constant voltage integrated circuit controls whether the backlight sources in the backlight partitions emit light or not and brightness of light during luminescence by data lines. Because resistance and capacitance loading (RC loading) of far ends and near ends of the data lines (referred to as the far and near ends of the data lines) are inconsistent relative to the constant voltage integrated circuit, there is an effect of resistance voltage drop (IR drop), resulting in brightnesses of the backlight sources of the far and near ends of the data lines being different, thereby resulting in uneven backlight brightness. Meanwhile, the control method can further cause difficulty of fine adjustment on backlight brightness.

In order to solve the problems mentioned above, one embodiment of the present disclosure provides a backlight brightness control method and a backlight brightness control device. The backlight brightness control method and the backlight brightness control device will be further described in detail as follow with reference to the accompanying drawings and specific embodiments.

First, one embodiment of the present disclosure provides a backlight brightness control method. An execution subject of the backlight brightness control method can be a backlight brightness control device disposed in display equipment. The backlight brightness control device can be realized by software and/or hardware. The backlight brightness control device is configured to realize uniformity and fine adjustment of backlight brightness to improve display effect.

The display equipment includes a display panel and a backlight module providing backlight to the display panel.

Figure 1:
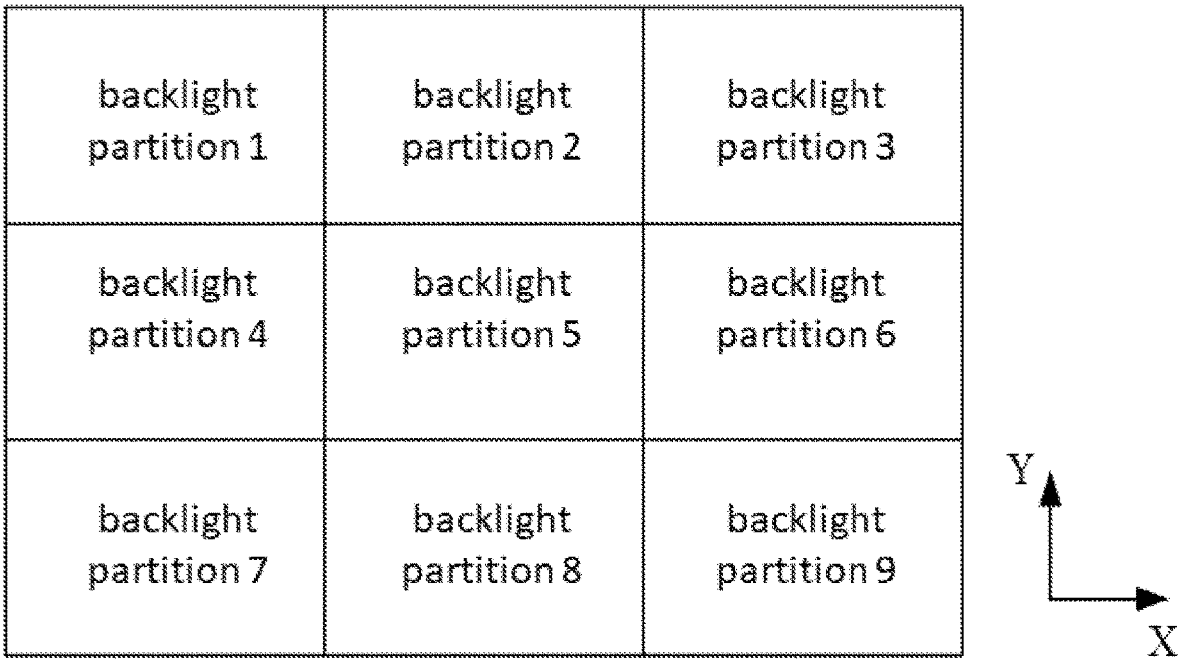
FIG. 1 is a schematic diagram of backlight partitions provided by one embodiment of the present disclosure.

Wherein, the backlight module includes a plurality of backlight partitions. FIG. 1 is a schematic diagram of backlight partitions provided by one embodiment of the present disclosure. As illustrated in FIG. 1, the backlight module includes M backlight partitions along a horizontal direction (X direction) and N backlight partitions along a vertical direction (Y direction), wherein $M \geq 1$, M is an integer, $N \geq 1$, and N is an integer. In FIG. 1, assuming $M=3$ and $Y=3$, the backlight module illustrated in FIG. 1 includes 9 backlight partitions, which are respectively a backlight partition 1, a backlight partition 2, . . . , a backlight partition 9.

Figure 2:
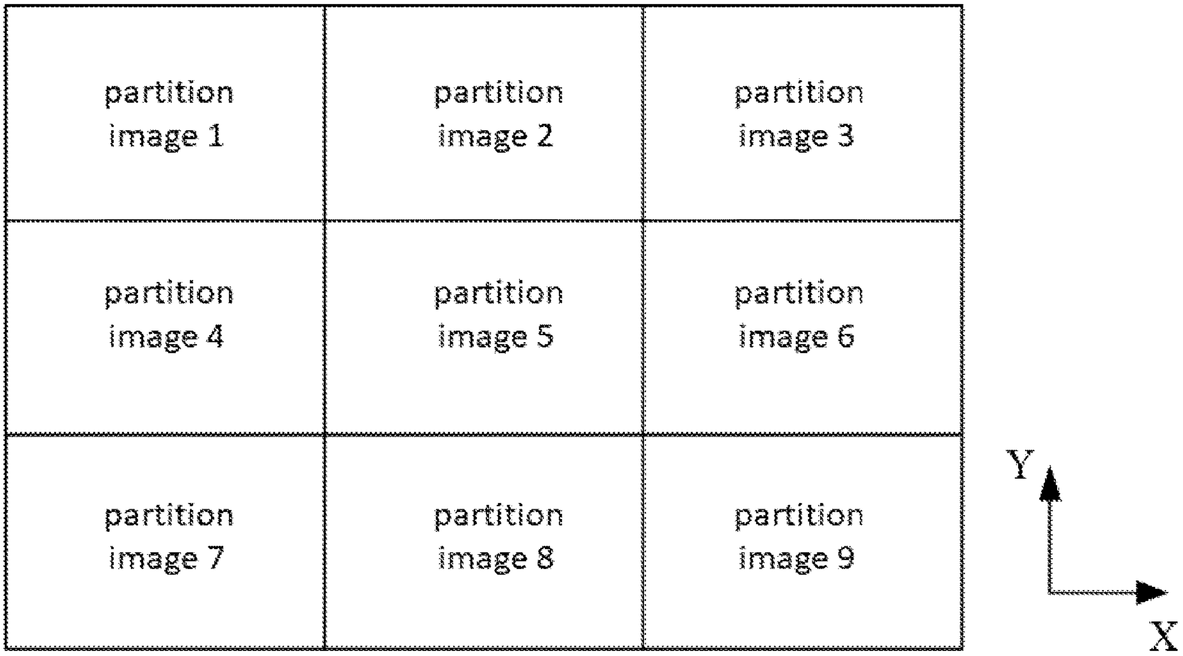
FIG. 2 is a schematic diagram of partition images provided by one embodiment of the present disclosure.

The display panel is configured to display images. The images include a plurality of partition images respectively corresponding to the plurality of backlight partitions one-to-one. FIG. 2 is a schematic diagram of partition images provided by one embodiment of the present disclosure. As illustrated in FIG. 2, the images displayed on the display panel is partitioned by using the same division rules as the backlight partitions, and 9 partition images corresponding to the 9 backlight partitions illustrated in FIG. 1 are obtained respectively, which are a partition image 1, a partition image 2, . . . , a partition image 9.

For any backlight partitions, the backlight partitions in the backlight module with same positions as the partitions act as the backlight partitions corresponding to the partition images. For example, the backlight partition 1 illustrated in FIG. 1 is the backlight partition corresponding to the partition image 1 illustrated in FIG. 2. It should be noted that boundaries between different backlight partitions and the boundaries between different partition images are virtual boundaries, and there will be no physical boundaries in actual design.

Figure 3:
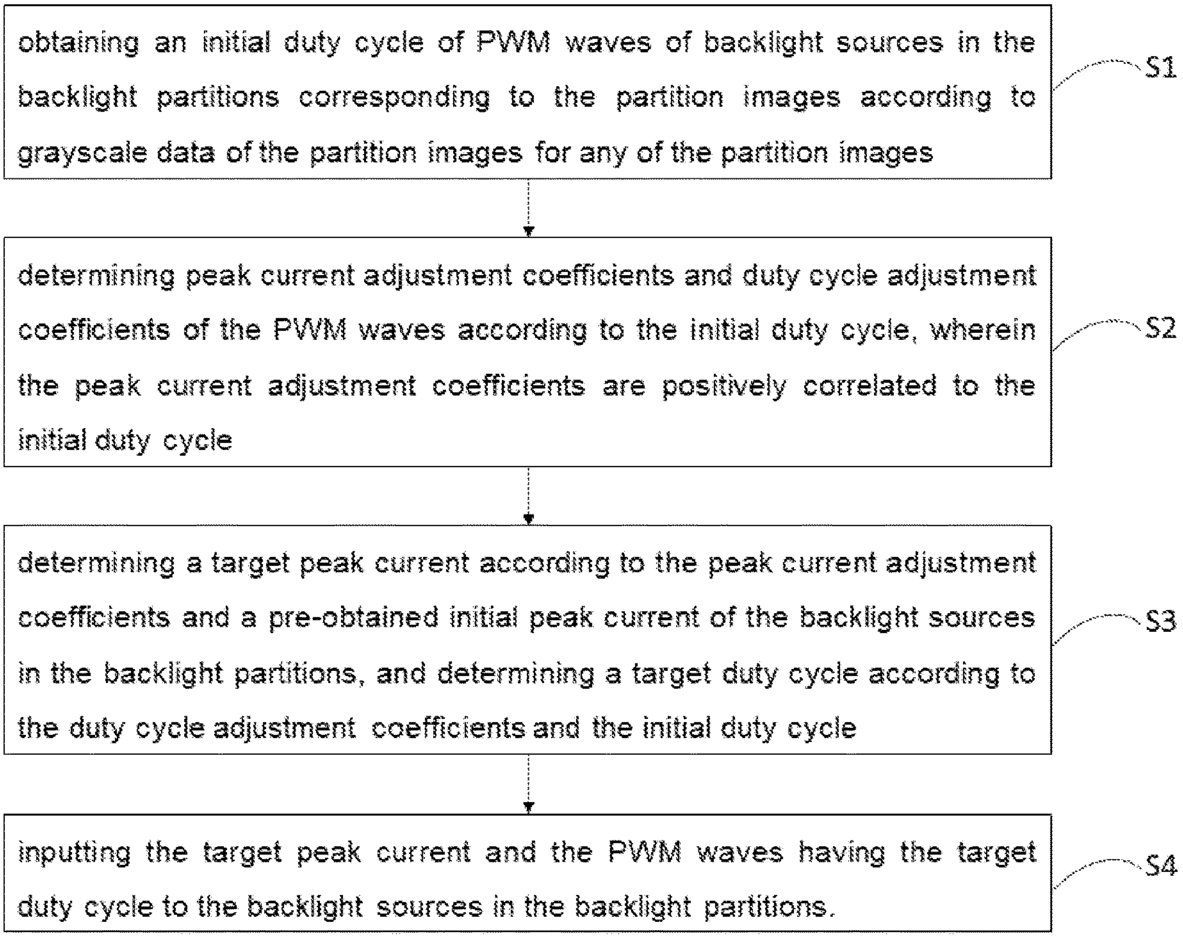
FIG. 3 is a flowchart of a backlight brightness control method provided by one embodiment of the present disclosure.

FIG. 3 is a flowchart of a backlight brightness control method provided by one embodiment of the present disclosure. As illustrated in FIG. 3, the backlight brightness control method includes:

step S1: obtaining an initial duty cycle of pulse width modulation (PWM) waves of backlight sources in the backlight partitions corresponding to the partition images according to grayscale data of the partition images for any of the partition images;

step S2: determining peak current adjustment coefficients and duty cycle adjustment coefficients of the PWM waves according to the initial duty cycle, wherein the peak current adjustment coefficients are positively correlated to the initial duty cycle;

step S3: determining a target peak current according to the peak current adjustment coefficients and a pre-obtained initial peak current of the backlight sources in the backlight partitions, and determining a target duty cycle according to the duty cycle adjustment coefficients and the initial duty cycle; and step S4: inputting the target peak current and the PWM waves having the target duty cycle to the backlight sources in the backlight partitions.

It should be noted that a basic concept of the embodiments of the present disclosure is to input current and PWM waves to the backlight sources in the backlight partitions to make the current multiply by the duty cycle of the PWM waves to obtain effective current. Brightness of the backlight sources in the backlight partitions is controlled by the effective current. Wherein, the current is outputted by the constant current integrated circuit. Generally, a maximum current outputted by the constant current integrated circuit is referred to as a peak current, i.e., the initial peak current in the embodiments of the present disclosure. Because the constant current integrated circuit is used to input the constant current to the backlight sources in the backlight partitions in the embodiments of the present disclosure, the uniformity of the backlight brightness is allowed to be improved compared to the design that the constant voltage integrated circuit inputs a constant voltage to the backlight source in the backlight partitions used in the prior art.

Obtaining the aforesaid electric current can be realized by using the constant current integrated circuit to input the initial peak current to the backlight source in the backlight partitions and to adjust the duty cycle of the PWM waves. For example, assuming that the initial peak current is 1 A and the required effective current is 0.25 A, the duty cycle of the PWM waves can be set as 25% to obtain an effective current of 0.25 A. However, adjustment of the duty cycle of the PWM waves is usually limited. In this embodiment, assuming that the duty cycle can be adjusted as 1%, 2%, . . . , 100%, there is a total of 100 positions. Therefore, in a situation that the initial peak current inputted to the backlight source in the backlight partitions is 1 A, the difference of the effective current corresponding to the adjacent duty cycle positions is 0.01 A. The difference is too large, resulting in difficulty of fine adjustment on backlight brightness.

In order to solve the problems mentioned above, current inputted to the backlight sources in the backlight partitions can be reduced. For example, the current can be reduced from 1 A of the initial peak current to 0.25 A. At this time, the duty cycle of the PWM waves is 100%, thereby obtaining an electric current of 0.25 A. In this situation, the difference of the effective current corresponding to adjacent duty cycle positions can reach 0.0025 A, which is much less than 0.01 A. Therefore, compared to the aforesaid situation, fineness during adjusting the backlight brightness is greatly improved, and the fine adjustment on the backlight brightness is realized.

On the basis of this, in one embodiment of the present disclosure, the initial duty cycle of PWM waves of the backlight sources in the backlight partitions corresponding to the partition images is obtained according to the grayscale data of the partition images.

Wherein, the initial duty cycle of the PWM waves of the backlight sources is configured to indicate a grayscale level of the partition images corresponding to the backlight partitions. If the initial duty cycle is larger, the grayscale level of the partition images is higher; and if the initial duty cycle is smaller, the grayscale level of the partition images is lower.

The peak current adjustment coefficient and the duty cycle adjustment coefficients of the PWM waves of the backlight sources in the backlight partitions corresponding to the partition images are determined according to the initial duty cycle.

Wherein, the peak current adjustment coefficients refer to coefficients configured to adjust the initial peak current of the constant current integrated circuit inputted to the backlight sources in the backlight partitions, and the peak current adjustment coefficients are positively correlated to the initial duty cycle. It can be understood that if the initial duty cycle is larger, the grayscale level of the partition images is higher, at this time, the brightness required by the backlight partitions is higher, and the effective current required by the backlight partitions is larger, so the peak current adjustment coefficient is larger; and If the initial duty cycle is smaller, the grayscale level of the partition images is lower, at this time, the brightness required by the backlight partitions is lower, and the effective current required by the backlight partitions is smaller, so the peak current adjustment coefficient is smaller. In one embodiment of the present disclosure, peak current adjustment coefficients are less than or equal to 1.

By multiplying the initial peak current by the peak current adjustment coefficients, the adjusted peak current can be obtained, i.e., the target peak current of the embodiments of the present disclosure. The target peak current is configured to be inputted to the backlight sources in the backlight partitions.

The duty cycle adjustment coefficients of the PWM waves refer to the coefficients configured to adjust the duty cycle of the PWM waves. Generally, when the current is switched, i.e., the initial peak current is switched into the target peak current, the backlight brightness should be ensured to remain unchanged. Therefore, the reciprocals of the peak current coefficients are used to act as the duty cycle adjustment coefficients.

By multiplying the duty cycle of the PWM waves before adjustment (the initial duty ratio of the embodiment of the present disclosure) by the duty cycle adjustment coefficients, the duty cycle of the adjusted PWM waves can be obtained, i.e., the target duty cycle of the embodiments of the present disclosure.

By inputting the target peak current and the PWM waves having the target duty cycle to the backlight sources in the backlight partitions, the corresponding electric current is generated, and the brightness of the backlight sources in the backlight partitions is controlled by the electric current.

Because the target peak current inputted to the backlight sources in the backlight partitions is allowed to be determined according to the grayscale level of the partition images in the embodiments of the present disclosure, if the grayscale level is higher, the target peak current is larger, and if the grayscale level is lower, the target peak current is smaller. Hence, not only can the backlight brightness required by the high grayscale level be ensured, but fine adjustment of the backlight brightness under the low grayscale level can also be ensured.

On the basis of the aforesaid embodiment, the step S2 of the aforesaid embodiment is described in one embodiment of the present disclosure. The step S2: determining peak current adjustment coefficients and duty cycle adjustment coefficients of the PWM waves according to the initial duty cycle specifically includes: using reciprocals of the peak current adjustment coefficients as the duty cycle adjustment coefficients of the PWM waves of the backlight sources in the backlight partitions. Generally, when the current is switched, i.e., the initial peak current is switched into the target peak current, the backlight brightness should be ensured to remain unchanged. Therefore, the reciprocals of the peak current coefficients are used to act as the duty cycle adjustment coefficients.

On the basis of the aforesaid embodiment, the step S2 of the aforesaid embodiment is described in one embodiment of the present disclosure. The step S2: determining peak current adjustment coefficients and duty cycle adjustment coefficients of the PWM waves according to the initial duty cycle specifically includes:

using the peak current adjustment coefficients corresponding to the initial duty cycle falling within initial duty cycle intervals as the peak current adjustment coefficients of the backlight sources in the backlight partitions according to a corresponding relation between preset initial duty cycle intervals and the peak current adjustment coefficients.

Specifically, the initial duty cycle of the PWM waves of the backlight sources is configured to indicate a grayscale level of the partition images corresponding to the backlight partitions. If the initial duty cycle is larger, the grayscale level of the partition images is higher, at this time, the brightness required by the backlight partitions is higher, and the effective current required by the backlight partitions is larger, so the peak current adjustment coefficient is larger. If the initial duty cycle is smaller, the grayscale level of the partition images is lower, at this time, the brightness required by the backlight partitions is lower, and the effective current required by the backlight partitions is smaller, so the peak current adjustment coefficient is smaller.

From the above, the peak current adjustment coefficients are positively correlated to the initial duty cycle. Therefore, in one embodiment of the present disclosure, the initial duty cycle intervals are set, and different initial duty cycles correspond to different peak current adjustment coefficients. For example, four initial duty cycle intervals are configured, which are respectively [0, 25%], (25%, 50%], (50%, 75%], and (75%, 100%], and the peak current adjustment coefficients corresponding to the four aforesaid initial duty cycle intervals are 0.25, 0.5, 0.75, and 1. It should be noted that the initial duty cycle interval of [0, 25%] refers to 0%≤initial duty cycle≤25%, the initial duty cycle interval of (25%, 50%] refers to 25%<initial duty cycle≤50%, the initial duty cycle interval of (50%, 75%] refers to 50%<initial duty cycle≤75%, and the initial duty cycle interval (75%, 100%] refers to 75%<initial duty cycle≤100%.

The corresponding relationship between the initial duty cycle intervals and the peak current adjustment coefficients is preset in the backlight brightness control device. When the backlight brightness control device executes the backlight brightness control method, initial duty cycle intervals that the initial duty cycle falls within are determined according to the initial duty cycle of the PWM waves of the backlight sources in the backlight partitions corresponding to the partition images, and the peak current adjustment coefficients corresponding to the initial duty cycle intervals that the ratio falls within are used as the peak current adjustment coefficients of the backlight sources in the backlight partitions corresponding to the partition images. For example, if the initial duty cycle of the PWM waves of the backlight sources in the backlight partitions is 25%, then the corresponding initial duty cycle interval is [0, 25%], and the peak current adjustment coefficient of the backlight sources in the backlight partitions corresponding to the partition images is 0.25.

On the basis of the aforesaid embodiment, steps after the step S4 of the aforesaid embodiment is described in one embodiment of the present disclosure. After step S4 of inputting the target peak current and the PWM waves having the target duty cycle to the backlight sources in the backlight partitions, the following includes:

step S5: determining target duty cycle intervals according to the initial duty cycle intervals and the duty cycle adjustment coefficients; and step S6: realizing brightness adjustment of the backlight sources in the backlight partitions by adjusting a duty cycle of the pulse width modulation waves in the target duty cycle intervals.

Wherein, the step S5 specifically includes:

step S51: determining a minimum endpoint value in the initial duty cycle intervals in which the initial duty cycle falls within;

step S52: multiplying the minimum endpoint value by the duty cycle adjustment coefficients to obtain a minimum target endpoint value; and step 53: using intervals composed of the minimum target endpoint value and a maximum target endpoint value as the target duty cycle intervals, wherein the maximum target endpoint value is 100%.

For example, four initial duty cycle intervals are configured, which are respectively [0, 25%], (25%, 50%], (50%, 75%], and (75%, 100%], and the peak current adjustment coefficients corresponding to the four aforesaid initial duty cycle intervals are 0.25, 0.5, 0.75, and 1. Correspondingly, the duty cycle adjustment coefficients of the PWM waves are 4, 2, 4/3, and 1. If the initial duty cycle interval of the PWM waves of the backlight sources in the backlight partitions corresponding to the partition images is 25%, then multiplying the minimum endpoint value of 0 in the initial duty cycle interval [0, 25%] by the duty cycle adjustment coefficient of 4 to obtain the minimum target endpoint value of 0. Then, an interval of [0, 100%] composed of the maximum target endpoint value of 0 and a maximum target endpoint value of 100% act as the target duty cycle interval. In a range of the target duty cycle interval of [0, 100%], brightness of the backlight sources in the backlight partitions is controlled by adjusting the target duty cycle. Therefore, the fine adjustment of backlight brightness in low grayscale levels is allowed to be ensured.

On the basis of the aforesaid embodiments, in one embodiment of the present disclosure, the initial duty cycle intervals are respectively [0, 25%], (25%, 50%], (50%, 75%], and (75%, 100%], and correspondingly the peak current adjustment coefficients are respectively 0.25, 0.5, 0.75, and 1, and the target duty cycle intervals are respectively [0, 100%], (50%, 100%], (66.7%, 100%], and (75%, 100%]. It should be noted that the target duty cycle interval of [0, 100%] refers to 0%≤target duty cycle≤100%, the target duty cycle interval of (50%, 100%] refers to 50%<target duty cycle≤100%, the target duty cycle interval of (66.7%, 100%] refers to 66.7%<target duty cycle≤100%, and the target duty cycle interval of (75%, 100%] refers to 75%<target duty cycle≤100%.

The backlight brightness control method of one embodiment of the present disclosure is described in combination with specific examples.

TABLE 1 a table of a corresponding relation of coefficients in the backlight rightness control method:

| initial duty cycle intervals | target peak current position | peak current coefficient | target peak current (initial peak current, Imax) | target duty cycle intervals | backlight brightness (Pk) |
|---|---|---|---|---|---|
| [0, 25%] | 00 | 0.25 | 0.25 Imax | [0, 100%] | 0~0.25 Pk |
| (25%, 50%] | 01 | 0.5 | 0.5 Imax | (50%, 100%] | 0.25 Pk~0.5 Pk |
| (50%, 75%] | 10 | 0.75 | 0.75 Imax | (66.7%, 100%] | 0.5 Pk~0.75 Pk |
| (75%, 100%] | 11 | 1 | Imax | (75%, 100%] | 0.75 Pk~Pk |

Table 1 is a table of a corresponding relation of coefficients in the backlight brightness control method. As illustrated in FIG. 1, if the obtained initial duty cycle of the PWM waves of the backlight source in the corresponding backlight partitions according to the grayscale data of the partition image falls within the interval of [0, 25%], then the peak current coefficient is 0.25. Therefore, a position of the target peak current can be adjusted to a corresponding position of 00 corresponding to 0.25 to output the target peak current of 0.25 Imax. At this time, in order to ensure brightness to remain unchanged during switching current, PWM waves with a target duty cycle of 4 times of the initial duty cycle is outputted. After this, under the target peak current of 0.25 Imax, fine adjustment of the backlight brightness in a range of 0 to 0.25 Pk can be realized by adjusting the target duty cycle within the target duty cycle interval of [0, 100%].

If the obtained initial duty cycle of the PWM waves of the backlight source in the corresponding backlight partitions according to the grayscale data of the partition image falls within the interval of (25%, 50%], then the peak current coefficient determined to be 0.5. Therefore, a position of the target peak current can be adjusted to a corresponding position of 01 corresponding to 0.5 to output the target peak current of 0.5 Imax. At this time, in order to ensure brightness to remain unchanged during switching current, PWM waves with a target duty cycle of 2 times of the initial duty cycle is outputted. After this, under the target peak current of 0.5 Imax, fine adjustment of the backlight brightness in a range of 0.25 pk to 0.5 Pk can be realized by adjusting the target duty cycle within the target duty cycle interval of (50%, 100%].

If the obtained initial duty cycle of the PWM waves of the backlight source in the corresponding backlight partitions according to the grayscale data of the partition image falls within the interval of (50%, 75%], then the peak current coefficient determined to be 0.75. Therefore, a position of the target peak current can be adjusted to a corresponding position of 10 corresponding to 0.75 to output the target peak current of 0.75 Imax. At this time, in order to ensure brightness to remain unchanged during switching current, PWM waves with a target duty cycle of 4/3 times of the initial duty cycle is outputted. After this, under the target peak current of 0.75 Imax, fine adjustment of the backlight brightness in a range of 0.5 pk to 0.75 Pk can be realized by adjusting the target duty cycle within the target duty cycle interval of (66.7%, 100%].

If the obtained initial duty cycle of the PWM waves of the backlight source in the corresponding backlight partitions according to the grayscale data of the partition image falls within the interval of (75%, 100%], then the peak current coefficient determined to be 1. Therefore, a position of the target peak current can be adjusted to a corresponding position of 11 corresponding to 1 to output the target peak current of Imax. At this time, in order to ensure brightness to remain unchanged during switching current, PWM waves with a target duty cycle equal to the initial duty cycle is outputted. After this, under the target peak current of Imax, fine adjustment of the backlight brightness in a range of 0.75 pk to Pk can be realized by adjusting the target duty cycle within the target duty cycle interval of (75%, 100%].

Figure 4:
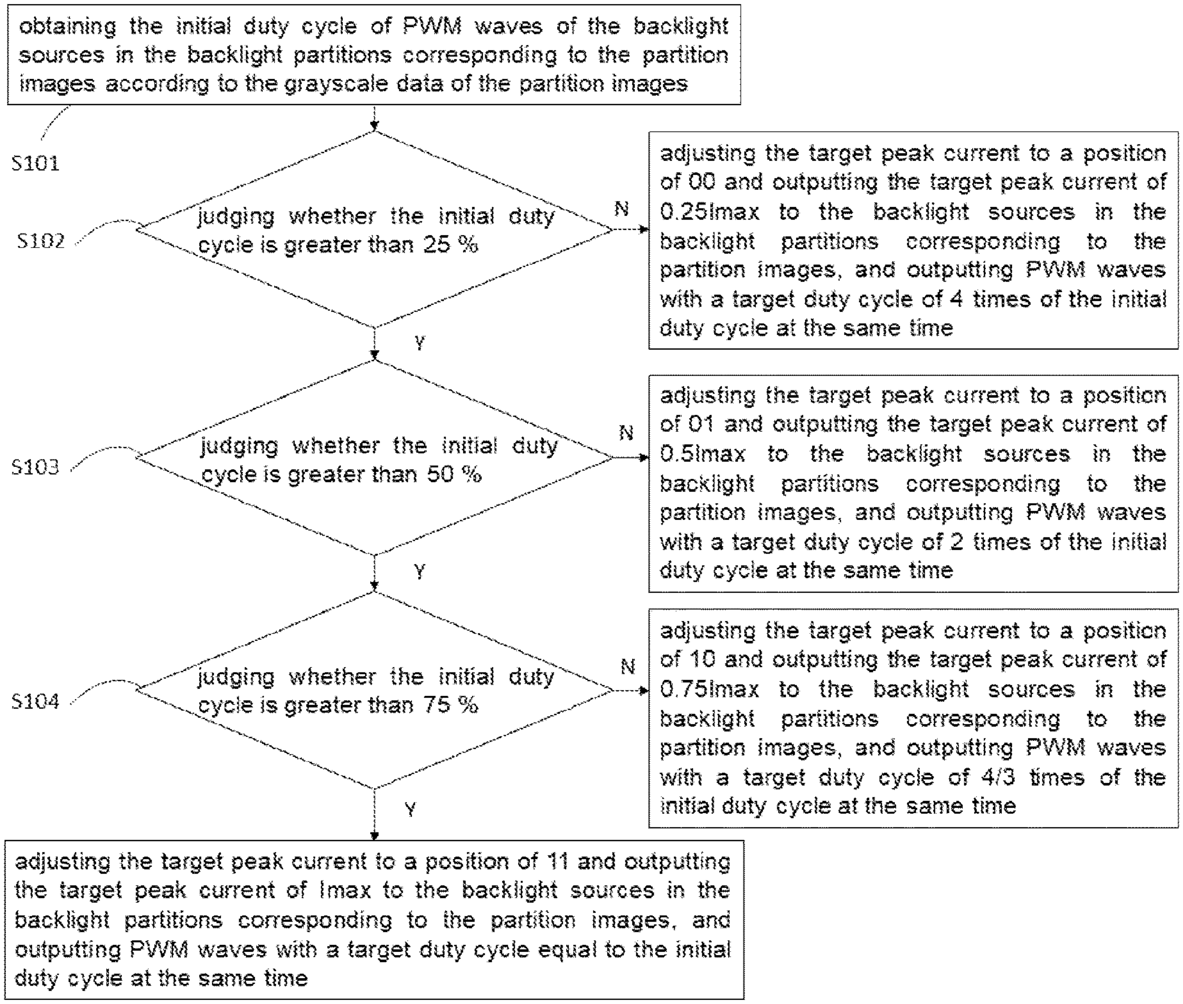
FIG. 4 is a complete flowchart of the backlight brightness control method provided by one embodiment of the present disclosure.

On the basis of the aforesaid embodiments, complete processes of the backlight brightness control method are described in one embodiment of the present disclosure. FIG. 4 is a complete flowchart of the backlight brightness control method provided by one embodiment of the present disclosure. As illustrated in FIG. 4:

step 101: obtaining the initial duty cycle of PWM waves of the backlight sources in the backlight partitions corresponding to the partition images according to the grayscale data of the partition images.

step 102: judging whether the initial duty cycle is greater than 25%; if not, adjusting the target peak current to a position of 00 and outputting the target peak current of 0.25 Imax to the backlight sources in the backlight partitions corresponding to the partition images, and outputting PWM waves with a target duty cycle of 4 times of the initial duty cycle at the same time; if true, executing step 103.

step 103: judging whether the initial duty cycle is greater than 50%; if not, adjusting the target peak current to a position of 01 and outputting the target peak current of 0.5 Imax to the backlight sources in the backlight partitions corresponding to the partition images, and outputting PWM waves with a target duty cycle of 2 times of the initial duty cycle at the same time; if true, executing step 104.

step 104: judging whether the initial duty cycle is greater than 75%; if not, adjusting the target peak current to a position of 10 and outputting the target peak current of 0.75 Imax to the backlight sources in the backlight partitions corresponding to the partition images, and outputting PWM waves with a target duty cycle of 4/3 times of the initial duty cycle at the same time; if true, adjusting the target peak current to a position of 11 and outputting the target peak current of Imax to the backlight sources in the backlight partitions corresponding to the partition images, and outputting PWM waves with a target duty cycle equal to the initial duty cycle at the same time.

On the basis of the aforesaid embodiment, the step S1 of the aforesaid embodiment is described in one embodiment of the present disclosure. In the step S1, obtaining the initial duty cycle of PWM waves of the backlight sources in the backlight partitions corresponding to the partition images according to the grayscale data of the partition images includes:

performing a digital-to-analog conversion on the grayscale data of the partition images to obtain the initial duty cycle of the PWM waves of the backlight sources in the backlight partitions corresponding to the partition images.

Specifically, the grayscale data of the partition images is digital data. A digital-to-analog conversion is performed on the grayscale data of the partition images to obtain the initial duty cycle of the PWM waves of the backlight sources in the backlight partitions corresponding to the partition images, and then the duty cycle of the PWM waves is obtained, that is, the initial duty cycle in the embodiments of the present disclosure.

On the basis of the aforesaid embodiment, the step S3 of the aforesaid embodiment is described in one embodiment of the present disclosure. In the step S3, determining the target peak current according to the peak current adjustment coefficients and the initial peak current and determining the target duty cycle according to the duty cycle adjustment coefficients and the initial duty cycle of the PWM waves include:

multiplying the initial peak current by the peak current adjustment coefficient to obtain the target peak current, and multiplying the initial duty cycle of the PWM waves by the duty cycle adjustment coefficients to obtain the target duty cycle.

Figure 5:
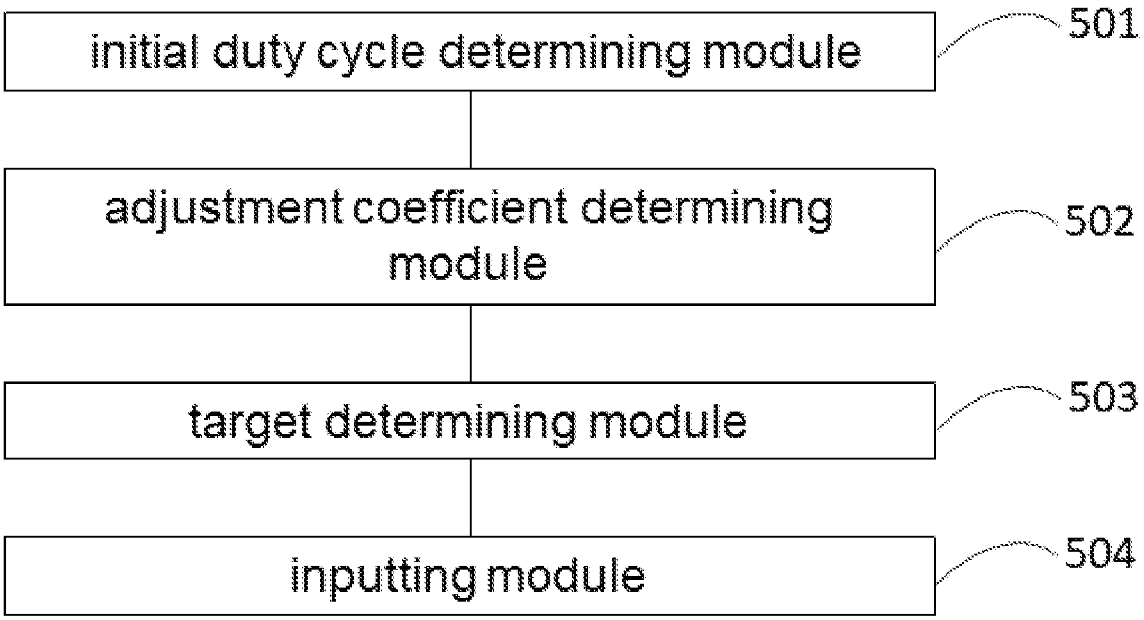
FIG. 5 is a structural schematic diagram of a backlight brightness control device provided by one embodiment of the present disclosure.

On the basis of the aforesaid embodiments, one embodiment of the present disclosure further provides a backlight brightness control device. The backlight brightness control device can be realized by software and/or hardware. The backlight brightness control device is configured to realize uniformity and fine adjustment of backlight brightness to improve display effect. The backlight brightness control device is used in display equipment. The display equipment includes a display panel and a backlight module providing backlight to the display panel. The backlight module includes a plurality of backlight partitions. The display panel is configured to display images. The images include a plurality of partition images respectively corresponding to the plurality of backlight partitions one-to-one. FIG. 5 is a structural schematic diagram of the backlight brightness control device provided by one embodiment of the present disclosure. As illustrated in FIG. 5, the backlight brightness control device includes:

an initial duty cycle determining module 501 configured to obtain an initial duty cycle of PWM waves of backlight sources in the backlight partitions corresponding to the partition images according to grayscale data of the partition images for any of the partition images; an adjustment coefficient determining module 502 configured to determine the peak current adjustment coefficients and duty cycle adjustment coefficients of the PWM waves according to the initial duty cycle, wherein the peak current adjustment coefficients are positively correlated to the initial duty cycle; a target determining module 503 configured to determine a target peak current according to the peak current adjustment coefficients and a pre-obtained initial peak current of the backlight sources in the backlight partitions and to determine a target duty cycle according to the duty cycle adjustment coefficients and the initial duty cycle; and an inputting module 504 configured to input the target peak current and the PWM waves having the target duty cycle to the backlight sources in the backlight partitions.

It should be noted that the backlight brightness control device provided by the embodiments of the present disclosure is configured to execute the backlight brightness control method provided by the aforesaid embodiments. Because the backlight brightness control method has been described in detail in the aforesaid embodiments, redundant description of the backlight brightness control device will not be mentioned herein again. In the backlight brightness control device provided by the embodiments of the present disclosure, because the constant current integrated circuit is used to input the constant current to the backlight sources in the backlight partitions, the uniformity of the backlight brightness can be improved; and because the target peak current inputted to the backlight sources in the backlight partitions can be determined according to the grayscale level of the partition images, not only the backlight brightness required by the high grayscale level can be ensured, but also fine adjustment of the backlight brightness under the low grayscale level can be ensured.

Figure 6:
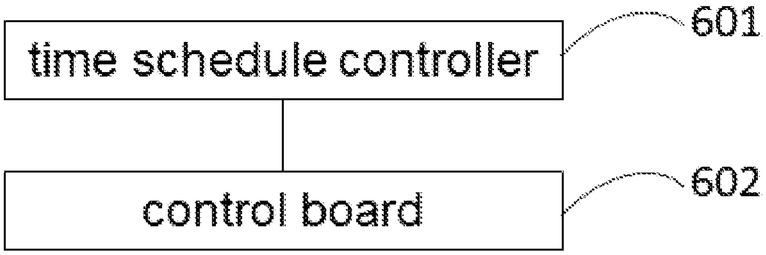
FIG. 6 is a structural schematic diagram of a driving device provided by one embodiment of the present disclosure.

On the basis of the aforesaid embodiments, physical hardware structures of the backlight brightness control device are described in one embodiment of the present disclosure, and the backlight brightness control device can be integrated in a driving device of the display equipment. FIG. 6 is a structural schematic diagram of a driving device provided by one embodiment of the present disclosure. As illustrated in FIG. 6, the driving device includes a time schedule controller 601 and a control board 602 electrically connected to the time schedule controller 601, and the control board 602 is further electrically connected to a backlight module in the display equipment. Wherein, the time schedule controller is configured to input grayscale data of the partition images to the control board. The control board is configured to convert the grayscale data into PWM waves, to determine the target peak current and the target duty cycle according to relations between the initial duty cycle of the PWM waves, the pre-set initial duty cycle intervals, peak current adjustment coefficients, and duty cycle adjustment coefficients, and to input the target peak current and the PWM waves having the target duty cycle to the backlight sources in the corresponding backlight partitions.

On the basis of the aforesaid embodiments, one embodiment of the present disclosure provides a display equipment. The display equipment includes the backlight brightness control device provided by the aforesaid embodiments. Because the backlight brightness control device has been described in detail in the aforesaid embodiments, redundant description will not be mentioned herein again.

It can be understood, that for those of ordinary skill in the art, various other corresponding changes and modifications can be made according to the technical solutions and technical ideas of the present disclosure, and all such changes and modifications are intended to fall within the scope of protection of the claims of the present disclosure.

What is claimed is:

1. A backlight brightness control method used in a display equipment, wherein the display equipment comprises a display panel and a backlight module providing backlight to the display panel, the backlight module comprises a plurality of backlight partitions, the display panel is configured to display images, the images comprise a plurality of partition images respectively corresponding to the plurality of backlight partitions one-to-one, wherein the backlight brightness control method comprises:

obtaining an initial duty cycle of pulse width modulation waves of backlight sources in the backlight partitions corresponding to the partition images according to grayscale data of the partition images for any of the partition images;

determining peak current adjustment coefficients and duty cycle adjustment coefficients of the pulse width modulation waves according to the initial duty cycle, wherein the peak current adjustment coefficients are positively correlated to the initial duty cycle;

determining a target peak current according to the peak current adjustment coefficients and a pre-obtained initial peak current of the backlight sources in the backlight partitions, and determining a target duty cycle according to the duty cycle adjustment coefficients and the initial duty cycle; and inputting the target peak current and the pulse width modulation waves having the target duty cycle to the backlight sources in the backlight partitions;

wherein determining the peak current adjustment coefficients and the duty cycle adjustment coefficients of the pulse width modulation waves according to the initial duty cycle comprises:

using corresponding peak current adjustment coefficients of initial duty cycle intervals including the initial duty cycle as the peak current adjustment coefficients of the backlight sources in the backlight partitions according to a corresponding relation between the initial duty cycle intervals and the peak current adjustment coefficients; and using reciprocals of the peak current adjustment coefficients as the duty cycle adjustment coefficients of the pulse width modulation waves of the backlight sources in the backlight partitions.

2. The backlight brightness control method as claimed in claim 1, wherein after inputting the target peak current and the pulse width modulation waves having the target duty cycle to the backlight sources in the backlight partitions further comprises:

determining target duty cycle intervals according to the initial duty cycle intervals and the duty cycle adjustment coefficients; and realizing brightness adjustment of the backlight sources in the backlight partitions by adjusting a duty cycle of the pulse width modulation waves in the target duty cycle intervals.

3. The backlight brightness control method as claimed in claim 2, wherein determining the target duty cycle intervals according to the initial duty cycle intervals and the duty cycle adjustment coefficients comprises:

determining a minimum endpoint value in the initial duty cycle intervals in which the initial duty cycle falls within;

multiplying the minimum endpoint value by the duty cycle adjustment coefficients to obtain a minimum target endpoint value; and using intervals composed of the minimum target endpoint value and a maximum target endpoint value as the target duty cycle intervals, wherein the maximum target endpoint value is 100%.

4. The backlight brightness control method as claimed in claim 3, wherein the initial duty cycle intervals are respectively [0, 25%], (25%, 50%], (50%, 75%], and (75%, 100%], and correspondingly the peak current adjustment coefficients are respectively 0.25, 0.5, 0.75, and 1, and the target duty cycle intervals are respectively [0, 100%], (50%, 100%], (66.7%, 100%], and (75%, 100%].

5. The backlight brightness control method as claimed in claim 1, wherein obtaining the initial duty cycle of the pulse width modulation waves of the backlight sources in the backlight partitions corresponding to the partition images according to the grayscale data of the partition images comprises:

performing a digital-to-analog conversion on the grayscale data of the partition images to obtain the initial duty cycle of the pulse width modulation waves of the backlight sources in the backlight partitions corresponding to the partition images.

6. The backlight brightness control method as claimed in claim 1, wherein determining the target peak current according to the peak current adjustment coefficients and the pre-obtained initial peak current of the backlight sources in the backlight partitions, and determining the target duty cycle according to the duty cycle adjustment coefficients and the initial duty cycle comprise:

multiplying the initial peak current by the peak current adjustment coefficients to obtain the target peak current, and multiplying the initial duty cycle by the duty cycle adjustment coefficients to obtain the target duty cycle.

7. A control device used in a display equipment, wherein the display equipment comprises a display panel and a backlight module providing backlight to the display panel, the backlight module comprises a plurality of backlight partitions, the display panel is configured to display images, the images comprise a plurality of partition images respectively corresponding to the plurality of backlight partitions one-to-one, wherein the control device comprises a control board, and the control board performs operations comprising:

obtaining an initial duty cycle of pulse width modulation waves of backlight sources in the backlight partitions corresponding to the partition images according to grayscale data of the partition images for any of the partition images;

determining peak current adjustment coefficients and duty cycle adjustment coefficients of the pulse width modulation waves according to the initial duty cycle, wherein the peak current adjustment coefficients are positively correlated to the initial duty cycle;

determining a target peak current according to the peak current adjustment coefficients and a pre-obtained initial peak current of the backlight sources in the backlight partitions and to determining a target duty cycle according to the duty cycle adjustment coefficients and the initial duty cycle; and inputting the target peak current and the pulse width modulation waves having the target duty cycle to the backlight sources in the backlight partitions;

wherein determining the peak current adjustment coefficients and the duty cycle adjustment coefficients of the pulse width modulation waves according to the initial duty cycle comprises:

using corresponding peak current adjustment coefficients of initial duty cycle intervals including the initial duty cycle as the peak current adjustment coefficients of the backlight sources in the backlight partitions according to a corresponding relation between the initial duty cycle intervals and the peak current adjustment coefficients; and using reciprocals of the peak current adjustment coefficients as the duty cycle adjustment coefficients of the pulse width modulation waves of the backlight sources in the backlight partitions.

8. The backlight brightness control device as claimed in claim 7, wherein the operations further comprise:

determining target duty cycle intervals according to the initial duty cycle intervals and the duty cycle adjustment coefficients; and realizing brightness adjustment of the backlight sources in the backlight partitions by adjusting a duty cycle of the pulse width modulation waves in the target duty cycle intervals.

9. The backlight brightness control device as claimed in claim 8, wherein determining the target duty cycle intervals according to the initial duty cycle intervals and the duty cycle adjustment coefficients comprises:

determining a minimum endpoint value in the initial duty cycle intervals in which the initial duty cycle falls within;

multiplying the minimum endpoint value by the duty cycle adjustment coefficients to obtain a minimum target endpoint value; and using intervals composed of the minimum target endpoint value and a maximum target endpoint value as the target duty cycle intervals, wherein the maximum target endpoint value is 100%.

10. The backlight brightness control device as claimed in claim 9, wherein the initial duty cycle intervals are respectively [0, 25%], (25%, 50%], (50%, 75%], and (75%, 100%], and correspondingly the peak current adjustment coefficients are respectively 0.25, 0.5, 0.75, and 1, and the target duty cycle intervals are respectively [0, 100%], (50%, 100%], (66.7%, 100%], and (75%, 100%].

11. The backlight brightness control device as claimed in claim 7, wherein obtaining the initial duty cycle of the pulse width modulation waves of the backlight sources in the backlight partitions corresponding to the partition images according to the grayscale data of the partition images comprises:

performing a digital-to-analog conversion on the grayscale data of the partition images to obtain the initial duty cycle of the pulse width modulation waves of the backlight sources in the backlight partitions corresponding to the partition images.

12. The backlight brightness control device as claimed in claim 7, wherein determining the target peak current according to the peak current adjustment coefficients and the pre-obtained initial peak current of the backlight sources in the backlight partitions, and determining the target duty cycle according to the duty cycle adjustment coefficients and the initial duty cycle comprise:

multiplying the initial peak current by the peak current adjustment coefficients to obtain the target peak current and to multiply the initial duty cycle by the duty cycle adjustment coefficients to obtain the target duty cycle.

13. A display equipment, comprising a control device, a display panel, and a backlight module providing backlight to the display panel, the backlight module comprises a plurality of backlight partitions, the display panel is configured to display images, the images comprise a plurality of partition images respectively corresponding to the plurality of backlight partitions one-to-one, wherein the control device comprises a control board, and the control board performs operations comprising:

obtaining an initial duty cycle of pulse width modulation waves of backlight sources in the backlight partitions corresponding to the partition images according to grayscale data of the partition images for any of the partition images;

determining peak current adjustment coefficients and duty cycle adjustment coefficients of the pulse width modulation waves according to the initial duty cycle, wherein the peak current adjustment coefficients are positively correlated to the initial duty cycle;

determining a target peak current according to the peak current adjustment coefficients and a pre-obtained initial peak current of the backlight sources in the backlight partitions and to determining a target duty cycle according to the duty cycle adjustment coefficients and the initial duty cycle; and inputting the target peak current and the pulse width modulation waves having the target duty cycle to the backlight sources in the backlight partitions;

wherein determining the peak current adjustment coefficients and the duty cycle adjustment coefficients of the pulse width modulation waves according to the initial duty cycle comprises:

using corresponding peak current adjustment coefficients of initial duty cycle intervals including the initial duty cycle as the peak current adjustment coefficients of the backlight sources in the backlight partitions according to a corresponding relation between the initial duty cycle intervals and the peak current adjustment coefficients; and using reciprocals of the peak current adjustment coefficients as the duty cycle adjustment coefficients of the pulse width modulation waves of the backlight sources in the backlight partitions.

14. The display equipment as claimed in claim 13, wherein the operations further comprise:

determining target duty cycle intervals according to the initial duty cycle intervals and the duty cycle adjustment coefficients; and realizing brightness adjustment of the backlight sources in the backlight partitions by adjusting a duty cycle of the pulse width modulation waves in the target duty cycle intervals.

* * * * *